United States Patent
Burr et al.

[11] Patent Number: 5,255,547
[45] Date of Patent: Oct. 26, 1993

[54] IGNITION LOCK WITH DUAL UNLOCKING MODES

[75] Inventors: Larry W. Burr, Saginaw; James E. Rouleau, Bay City; Ricardo A. Pastor, Saginaw; Christian E. Ross, Freeland, all of Mich.

[73] Assignee: General Motors Corporation, Detroit, Mich.

[21] Appl. No.: 932,121

[22] Filed: Aug. 19, 1992

[51] Int. Cl.⁵ .................................................. E05B 47/06
[52] U.S. Cl. ...................................... 70/252; 70/279; 70/496; 70/256
[58] Field of Search ............... 70/252, 256, 257, 277, 70/279, 494, 495, 496

[56] References Cited

U.S. PATENT DOCUMENTS

| | | | |
|---|---|---|---|
| 3,241,344 | 3/1966 | Peters | 70/279 |
| 3,709,006 | 1/1973 | Seidewand | 70/364 R |
| 3,779,332 | 12/1973 | Snitgen | 180/112 |
| 4,137,985 | 2/1979 | Winchell | 180/114 |
| 4,332,306 | 6/1982 | Turatti | 70/252 |
| 4,426,864 | 1/1984 | Morikawa | 70/279 |
| 4,428,024 | 1/1984 | Mochida et al. | 70/278 |
| 4,583,148 | 4/1986 | Lipschutz | 361/172 |
| 4,603,564 | 8/1986 | Kleinhany et al. | 70/277 |
| 4,716,748 | 1/1988 | Watanuki et al. | 70/279 |
| 4,827,744 | 5/1989 | Namazue et al. | 70/256 |
| 4,848,115 | 7/1989 | Clarkson et al. | 70/276 |
| 4,898,010 | 2/1990 | Futami et al. | 70/278 |
| 4,939,915 | 7/1990 | Vonlanthen | 70/279 |
| 5,036,687 | 8/1991 | Takeuchi et al. | 70/252 |

Primary Examiner—Peter M. Cuomo
Assistant Examiner—Darnell M. Boucher
Attorney, Agent, or Firm—Saul Schwartz

[57] ABSTRACT

A motor vehicle ignition lock includes a housing, a lock barrel rotatable on the housing having a key slot, and a side bar on the lock barrel. The ignition lock further includes a solenoid on the housing and a slide on housing connected to a plunger of the solenoid. The slide has a notch which captures the side bar in an extended position of the side bar and an extended position of the slide. The ignition lock is unlocked in a mechanical unlocking mode by a key inserted in the key slot in the lock barrel to withdraw the side bar from the notch in the slide. The ignition lock is unlocked in an electronic unlocking mode by the solenoid when the plunger of the solenoid shifts the slide from its extended position to a retracted position to remove the notch from the side bar.

3 Claims, 2 Drawing Sheets

IGNITION LOCK WITH DUAL UNLOCKING MODES

FIELD OF THE INVENTION

This invention relates to ignition locks for motor vehicles.

BACKGROUND OF THE INVENTION

Traditional motor vehicle ignition locks include a barrel connected to an ignition switch, a stationary sleeve around the barrel, and a side bar on the barrel which projects into a slot in the sleeve to prevent rotation of the barrel. Such traditional locks are mechanically unlocked by a key inserted in a slot in the barrel. The key aligns tumblers in the barrel which, when aligned, permit springs in the barrel to retract the side bar into the barrel. With the side bar retracted, the barrel is rotatable in the sleeve to actuate the ignition switch.

Ignition locks having various electronic unlocking modes have also been proposed. In one example, a lock barrel controlling an ignition switch is immobilized by a solenoid plunger which is withdrawn when an electronically coded key is inserted in a slot in the barrel. In another example, an ignition switch is immobilized by a blocker which is withdrawn from a blocking position by a solenoid in response to a coded signal transmitted from a remote device, such as a remote door lock operator, to permit keyless actuation of the ignition switch.

Also, a lock having mechanical and electronic unlocking modes has been proposed in which both a key and a coded electronic signal are required for unlocking. That lock includes a key controlled barrel like a traditional lock and a solenoid operated plunger like an electronic lock which plunger blocks rotation of a barrel until a coded signal is received, even if the key is in the barrel.

An ignition lock according to this invention has independent electronic and mechanical unlocking modes.

BRIEF SUMMARY OF THE INVENTION

This invention is a new and improved motor vehicle ignition lock having independent mechanical and electronic unlocking modes and including a stationary housing, a barrel on the housing rotatable between an OFF/LOCK position and an ON position, a first lock on the barrel having a mechanical unlocking mode, and a second lock on the stationary housing having an electronic unlocking mode. The barrel is released for rotation between its OFF/LOCK and ON positions by unlocking either of the first and second locks independently of the other. The first lock includes a traditional key controlled side bar on the barrel retracted into the barrel when a key is inserted into a key slot in the barrel. The second lock includes an electric solenoid on the stationary housing actuated by a coded signal to release the barrel for rotation independently of the position of the side bar. In a preferred embodiment, the solenoid of the second lock shifts a slider on the stationary housing into and out of engagement with the side bar to release the barrel.

DESCRIPTION OF A PREFERRED EMBODIMENT

Figure 1:
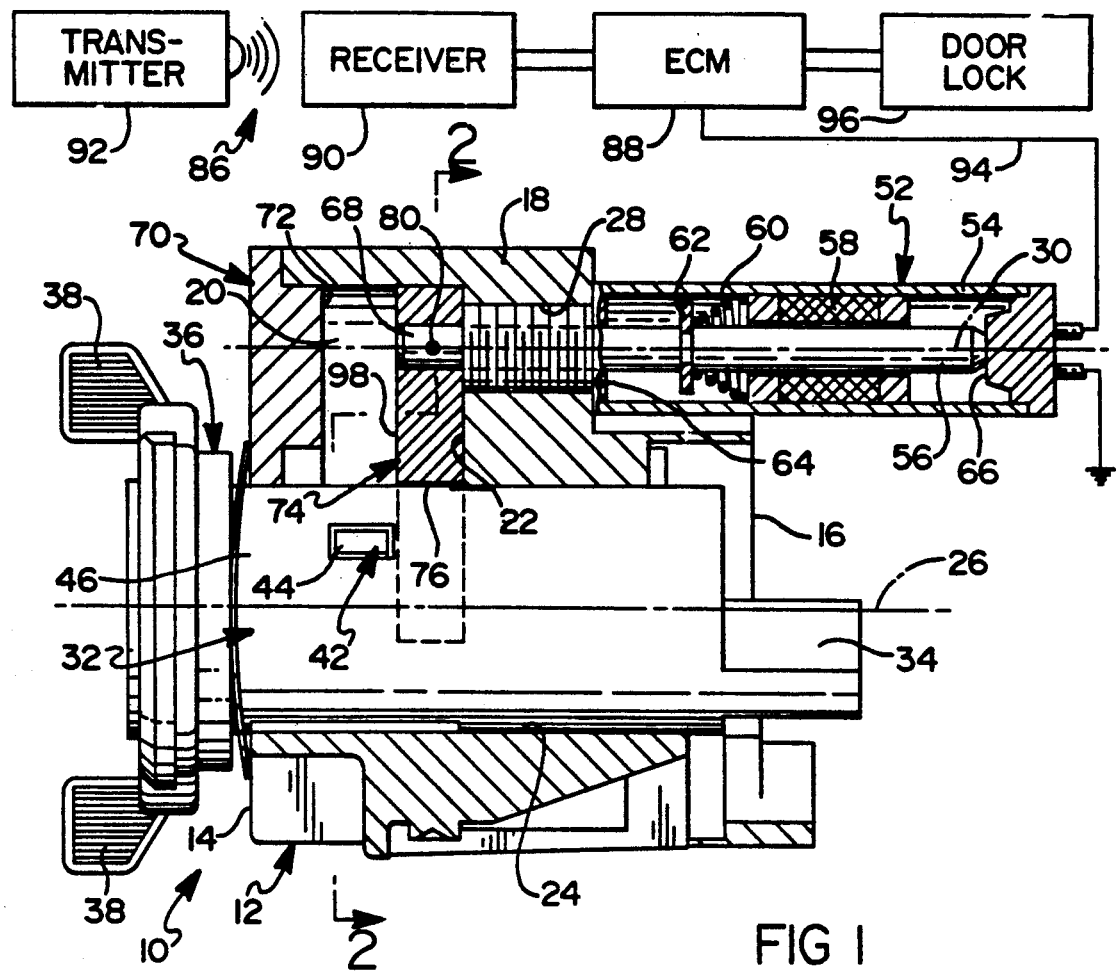
FIG. 1 is a partially broken-away longitudinal sectional view of an ignition lock according to this invention including a schematic representation of an electronic control system for the lock.

Referring to the drawings, an ignition lock (10) according to this invention includes a housing (12) adapted for rigid attachment to a vehicle body at a location convenient to a driver, such as on a steering column, not shown. The housing (12) has a front side (14), a back side (16), and an integral boss (18). The housing is relieved at the front side to define a slide chamber (20) which terminates at an internal back wall (22) of the housing (12). A first bore (24) in the housing below the slide chamber (20) is aligned on a first axis (26) of the housing. A second bore (28) in the boss (18) is aligned on a second axis (30) of the housing parallel to the first axis (26) and opens into the slide chamber (20) through the internal back wall (22).

A generally cylindrical lock barrel (32) is supported on the housing (12) in the first bore (24) for rotation about the first axis (26) relative to the housing. The lock barrel (32) has a driver (34) at a back or inboard end thereof outside the back side (16) of the housing (12) and a bezel (36) at a front or outboard end thereof outside the front side (14) of the housing. Both the driver and the bezel are rotatable as a unit with the barrel.

The driver is adapted for connection to a motor vehicle ignition switch, not shown, such that rotation of the barrel from an OFF/LOCK position thereof to an ON position thereof transitions the ignition switch from a condition corresponding to engine-off to a condition corresponding to engine-on. The bezel (34) has a pair of finger tabs (38) which define a handle for gripping and rotating the barrel between its OFF/LOCK and ON positions.

Figure 2:
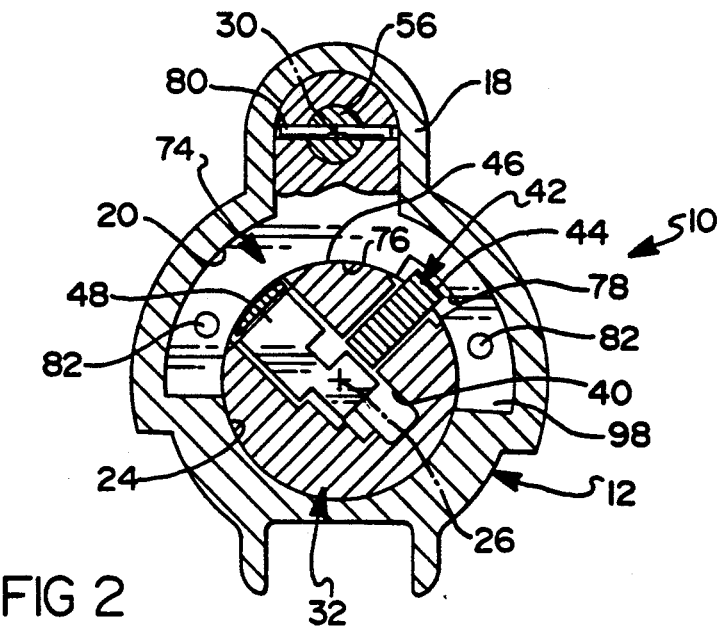
FIG. 2 is a sectional view taken generally along the plane indicated by lines 2-2 in FIG. 1.
Figure 3:
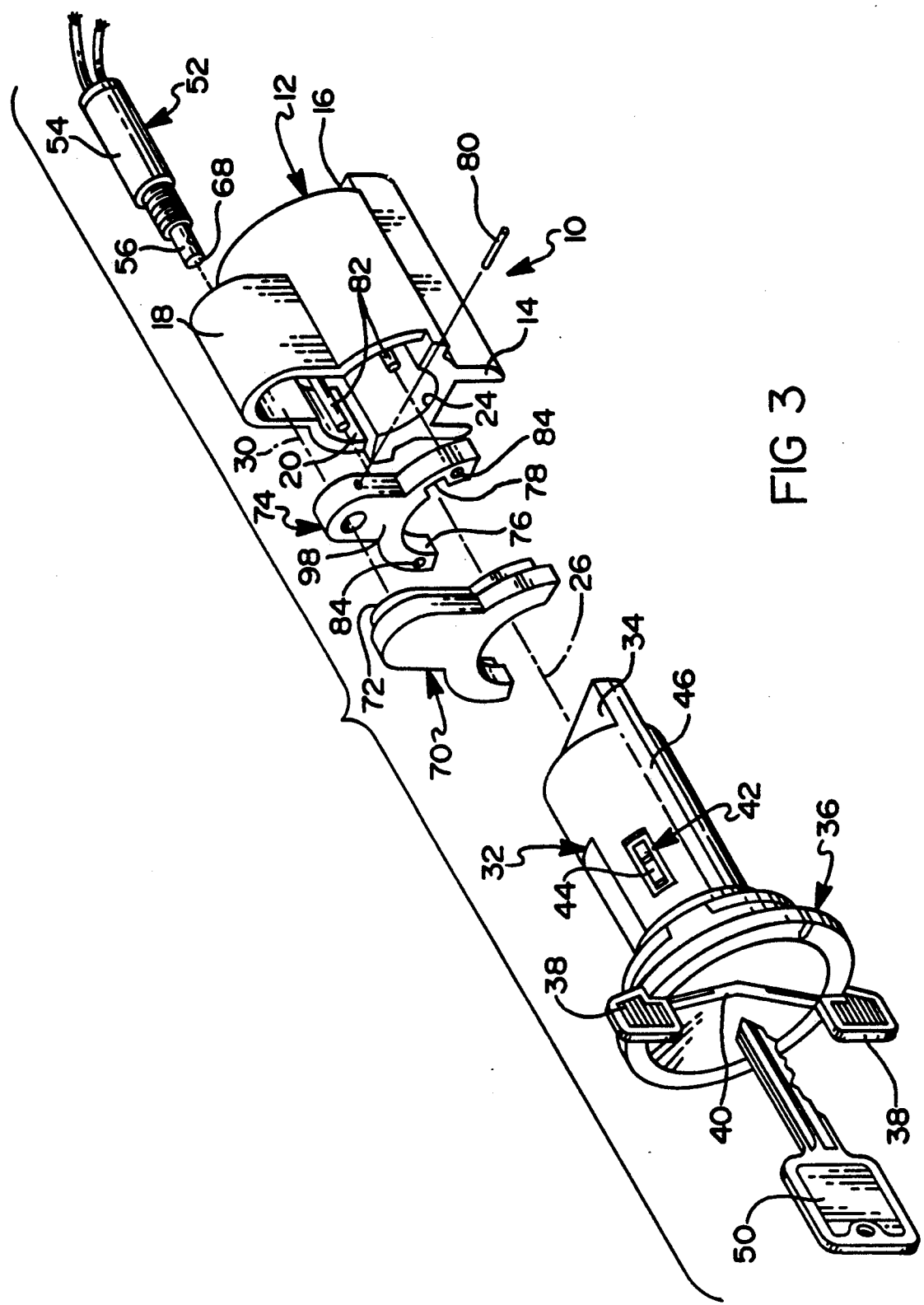
FIG. 3 an exploded perspective view of the ignition lock according to this invention.

As seen best in FIGS. 2-3, the barrel (32) has a conventional key slot (40) opening through the bezel (36) and a side bar (42) supported on the barrel for radial bodily movement between a retracted position, FIG. 3, substantially completely withdrawn into the barrel and an extended position, FIG. 2, wherein an outboard end (44) of the side bar projects beyond a cylindrical wall (46) of the barrel. Internally, the barrel (32) has a plurality of tumblers (48) which cooperate with the side bar and with internal springs, not shown, on the barrel in conventional fashion to lock the side bar (42) in its extended position when the key slot (40) is empty and to shift the side bar to its retracted position when a key (50) is inserted in the key slot. U.S. Pat. No. 3,709,006, issued Jan. 9, 1973 and assigned to the assignee of this invention, describes an ignition lock with cooperating side bar, tumblers and internal springs.

The ignition lock (10) further includes an electric solenoid (52) having an externally threaded sleeve (54), a cylindrical plunger (56) supported on the sleeve (54) for bodily shiftable movement in the length direction of the sleeve, and an annular wire coil (58) inside the sleeve surrounding the plunger. A spring (60) inside the sleeve (54) seats against the coil and against a retainer (62) on the plunger (56) and locates the plunger (56) in an extended position, not shown, when the solenoid is turned off defined by abutment of the retainer against an internal shoulder (64) of the sleeve (54), FIG. 1. Magnetic flux generated by the coil (58) when the solenoid is turned on shifts the plunger (56) in the opposite direction against the spring (60) to a retracted position, FIG. 1, defined by engagement of the plunger (56) on an internal stop (66) on the sleeve.

The sleeve (54) is threaded into the second bore (28) in the boss (18) on the housing (12) to rigidly mount the solenoid on the housing (12) with the plunger (56) shiftable between its extended and retracted positions in the direction of the second axis (30). A distal end (68) of the plunger projects into the slide chamber (20). A fork-shaped cover (70), FIGS. 1 and 3, on the housing (12) closes the open side of the slide chamber (20). An inside surface of the cover (70) defines an internal front wall (72) of the slide chamber (20).

A fork-shaped slide (74) is disposed in the slide chamber (20) and has a curved inner edge (76) which matches and slides on the cylindrical wall (46) of the barrel (32) and a notch (78) in the inner edge aligned with the side bar (42) on the barrel. The slide (74) is connected to the distal end (68) of the plunger (56) by a cross pin (80) for bodily movement as a unit with the plunger. A pair of guide pins (82) on the housing (12) are received in a corresponding pair of holes (84) in the slide to stabilize and guide the latter.

The slide (74) has a locking position, not shown, disposed generally adjacent the internal front wall (72) of the slide chamber and corresponding to the extended position of the solenoid plunger (56). The slide has an unlocking position, FIG. 1, disposed generally adjacent the internal back wall (22) of the slide chamber and corresponding to the retracted 30 position of the solenoid plunger (56). The notch (78) in the inner edge (76) of the slide is disposed over the side bar (42) in the locking position of the slide and is removed from the side bar in the unlocking position of the slide.

A schematically represented control system (86) of the ignition lock (10) turns the solenoid on and off and includes an electronic control module (ECM) (88), a receiver (90), and a remote transmitter (92). The ECM is connected to the receiver (90) and to the solenoid (52) and turns the solenoid on by connecting the coil (58) to a voltage source, not shown, through a conductor (94) when a coded signal from the transmitter (92) is received by the receiver (90). In addition, the ECM (88) may be connected to a door lock operator (96) such that the latter is concurrently actuated when the aforesaid coded signal from the transmitter is received by the receiver (90).

The barrel (32), the side bar (42), and the springs and tumblers on the barrel constitute a first or mechanical locking means of the ignition lock. The solenoid coil (58) and plunger (56) constitute a second or electronic locking means of the ignition lock. The slide (74) constitutes a connecting means between the mechanical and electronic locking means which affords the ignition lock a mechanical unlocking mode and an electronic unlocking mode independent of the mechanical unlocking mode.

With no key in the key slot (40) and with the solenoid (52) turned off, the side bar (42) is locked by the tumblers (48) in its extended position and the spring (60) locates the plunger (56) in its extended position and, consequently, the slide (74) in its locking position. In that circumstance, the distal end of the side bar is captured in the notch (78) in the slide so that the barrel (32) is rotatably immobilized in its OFF/LOCK position. Accordingly, the ignition switch of the motor vehicle is secured against unauthorized operation.

When the key (50) is inserted in the key slot (40), the ignition lock (10) is unlocked in its mechanical mode. Specifically, the key initiates withdrawal of the side bar (42) to its retracted position within the barrel (32) to remove the distal end (44) from the notch (78). In that circumstance, the barrel is freely rotatable by the finger tabs (38) on the bezel (36) from its OFF/LOCK position its ON position while the slide (74) remains in its locking position. Of course, when the barrel is returned to its OFF/LOCK position and the key (50) removed from the key slot, the side bar (42) returns to its extended position with its distal end (44) in the notch (78) to secure the ignition switch again.

When the key slot (40) is empty, the ignition lock (10) may be unlocked in its electronic mode by a coded signal from the transmitter (92). For example, as a driver approaches the vehicle from outside and actuates the transmitter (92) to unlock a door lock of the vehicle, the ECM concurrently turns on the solenoid (52) to shift the plunger (56) from its extended position to its retracted position and the slide (74) from its locking position to its unlocking position. In that circumstance, the notch (78) is removed from the distal end (44) of the side bar (42) so that the barrel (32) is freely rotatable from its OFF/LOCK position to its ON position because the distal end (44) of the side bar is no longer captured in the notch (78).

For convenience, the ECM may include circuitry, not shown, dictating a timed cycle for the solenoid (52) when a coded signal is received from the transmitter. For example, when the coded signal is received, the ECM turns on the solenoid for a duration of about 30 seconds to allow the driver to enter the vehicle, grasp the tabs (38), and rotate the barrel (32) from its OFF-/LOCK position to its ON position. After that, the solenoid is turned off to recapture the side bar in the notch (78) if the barrel (32) has not been rotated out of its OFF/LOCK position.

If the barrel (32) is in its ON position when the timed cycle of the solenoid (52) expires, the ECM (88) turns off the solenoid and the spring (60) shifts the plunger (56) toward its extended position and the slide (74) toward its locking position. In the ON position of the barrel (32), however, the distal end (44) of the side bar is not aligned with the notch (78) in the slide so that the spring (60) shifts the slide (74) toward its locking position until a front side (98) of the slide butts against an edge of the side bar. In that circumstance, the edge of the side bar slides across the front side (98) of the slide (74) as the barrel (32) is turned from its ON to its OFF-/LOCK position. when the OFF/LOCK position is achieved, the notch (78) registers with the distal end (44) of the side bar and the spring (60) projects the slide (74) to its locking position.

Of course, the ECM (88) may include circuitry to additionally synchronize the mechanical and electronic locks of the ignition lock (10). For example, a sensor may be installed on the barrel (32) to detect entry of the key (50) into the key slot (40) and to signal the ECM accordingly. The ECM may then operate to prevent the solenoid from being turned on by the transmitter (92) to prevent concurrent unlocking in both the electronic and mechanical modes once unlocking in the mechanical mode is detected.

The embodimens of the invention in which an exclusive property or privilege is claimed are defined as follows:

1. A motor vehicle ignition lock comprising:

a housing adapted for rigid support on said motor vehicle, a lock barrel adapted for connection to an ignition switch of said motor vehicle and supported on said housing for rotation about a first axis between an OFF/LOCK position corresponding to said ignition switch being off and an ON position corresponding to said ignition switch being on, a mechanical lock means on said lock barrel including a key slot nad a side bar having an extended position defining a raial abutment on said lock barrel and shiftable upon insertion of a key into said key slot from said extended position to a retracted position inside said lock barrel, an electronic lock means on said hosing including an electric solenoid having aplunger aligned on and bodily shiftable in the direction of a second axis parallel to said first axis between an extended position when said electric solenoid is turned off and a retracted position when said electric solenoid is turned on, a slide, means mounting said slide on said housing with an edge of said slide juxtaposed said lock barrel and for boidly shiftable movement in a direction parallel to eachof said first and said second axes between a locking position and an unlocking position, means defining a notch in said ege of said slide receiving said side bar in said extended position of said side bar and in said locking position of said slide to prevent rotation of said lock barrel and being remote from said side bar in said extended position of said side bar and said unlocking position of said sldie to release said lock barrel for rotatin from said OFF/LOCK position to said ON position, and means connecting said slide to said solenoid plunger so that said plunger moves said slide between said locking and unlocking positions concurrently with movement of said plungr between said extending and said retracted positions.

2. The motor vehicle ignition lock recited in claim 1 further including:

an electronic control system connected to said electronic locking means including a remote transmitter and a receiver and an electronic control module operative to turn said solenoid on in response to a signal transmitted by said transmittr and received by said receiver.

3. The motor vehicle ignition lock recited in claim 2 wherein said electronic control system further includes:

a key sensor means operative to detect the presence of said key in said keyslot in said lock barrel, and means operative to prevent said electric solenoid from being turned on when said key sensor means detects said key in said key slot to prevent redundant unlocking of said ignition lock in said mechanical and said electronic unlocking modes.

* * * * *